United States Patent
Elgimiabi et al.

(10) Patent No.: US 12,359,018 B2
(45) Date of Patent: Jul. 15, 2025

(54) ROOM TEMPERATURE STABLE ONE-PART VOID FILLER

(71) Applicant: 3M INNOVATIVE PROPERTIES COMPANY, St. Paul, MN (US)

(72) Inventors: Sohaib Elgimiabi, Dusseldorf (DE); Frank Neuroth, Dormagen-Zons (DE)

(73) Assignee: 3M Innovative Properties Company, St. Paul, MN (US)

( * ) Notice: Subject to any disclaimer, the term of this patent is extended or adjusted under 35 U.S.C. 154(b) by 1044 days.

(21) Appl. No.: 17/295,907

(22) PCT Filed: Dec. 10, 2019

(86) PCT No.: PCT/IB2019/060621
§ 371 (c)(1),
(2) Date: May 21, 2021

(87) PCT Pub. No.: WO2020/121196
PCT Pub. Date: Jun. 18, 2020

(65) Prior Publication Data
US 2022/0017684 A1  Jan. 20, 2022

(30) Foreign Application Priority Data
Dec. 13, 2018  (EP) .................... 18212409

(51) Int. Cl.
*C08G 59/20* (2006.01)
*C08G 59/42* (2006.01)
*C08K 5/5415* (2006.01)
*C08L 63/00* (2006.01)

(52) U.S. Cl.
CPC ......... *C08G 59/20* (2013.01); *C08G 59/4215* (2013.01); *C08K 5/5415* (2013.01); *C08L 63/00* (2013.01)

(58) Field of Classification Search
None
See application file for complete search history.

(56) References Cited

U.S. PATENT DOCUMENTS

| 3,404,061 A | 10/1968 | Shane | |
|---|---|---|---|
| 2008/0167412 A1* | 7/2008 | Elgimiabi | C09K 21/02 524/436 |
| 2012/0022185 A1* | 1/2012 | Elgimiabi | C08K 5/17 523/451 |
| 2019/0284453 A1* | 9/2019 | Heintz | C09J 163/00 |

FOREIGN PATENT DOCUMENTS

| CA | 2334274 | 8/2001 |
|---|---|---|
| EP | 1674518 | 6/2006 |
| EP | 2818490 | 12/2014 |
| EP | 3275914 | 1/2018 |
| WO | WO 2010/117669 | 10/2010 |

OTHER PUBLICATIONS

International Search Report for PCT International Application No. PCT/IB2019/060621, mailed on Feb. 20, 2020, 4 pages.

* cited by examiner

*Primary Examiner* — Joseph D Anthony
(74) *Attorney, Agent, or Firm* — Carlos M. Téllez Rodríguez; 3M Innovative Properties Co

(57) ABSTRACT

A curable void filler composition comprising at least one epoxy resin; at least one epoxy curing agent comprising at least one bicyclic carboxylic acid anhydride; and at least one epoxysilane compound according to formula (1), where formula (1) is Glycidoxy-R1Si(OR2)(OR3)(OR4), and R1 is selected from linear or branched alkyl comprising from 1 and 15 carbon atoms; and R2, R4 and R4 may be different or the same, and are independently selected from linear or branched alkyl comprising from 2 to 15 carbon atoms.

16 Claims, No Drawings

ROOM TEMPERATURE STABLE ONE-PART VOID FILLER

CROSS REFERENCE TO RELATED APPLICATIONS

This application is a national stage filing under 35 U.S.C. 371 of PCT/IB2019/060621, filed Dec. 10, 2019, which claims the benefit of European Patent Application No. 18212409.9, filed Dec. 13, 2018, the disclosures of which are incorporated by reference in their entireties herein.

FIELD

The present disclosure relates to curable void filler compositions, more specifically to the field of epoxy resin based curable void filler compositions. The present disclosure further relates to cured void fillers obtained by curing the curable compositions. In another aspect, the present disclosure relates to a composite article comprising honeycomb cells which voids are filled with the void filler composition as described herein. The present disclosure also relates to a method for producing a composite article. In still a further aspect, the present disclosure relates to the use of the curable void filler compositions as described herein.

BACKGROUND

Transportation vehicles, such as automobiles, watercraft and, in particular, aircrafts frequently contain low weight materials to reduce fuel consumption. To achieve this purpose, sandwich composites with honeycomb core structures are frequently employed instead of solid structures. Also, in the construction of buildings such honeycomb structures have found wide application. Typically, the honeycomb core structure is formed by a metal, e.g. Aluminium, or fibreglass or composites, and the cells between the honeycomb cores are void. The size of the void cells in a honeycomb structure influences the mechanical properties of the structure. The bigger the size the greater the weight reduction but the greater may be the loss of mechanical strength. Void cells in honeycomb structures may typically range from 5 mm up to 10 cm in at least one or all three dimensions. To counteract the potential loss of mechanical strength compared to solid structures, the cells of the honeycomb structure are partially or completely filled with filler materials (core fillers or void fillers).

Epoxy resin-based compositions may be used for this purpose, for example those described in WO 2010/117669 A1. The external surfaces of the honeycomb structures are often covered by facesheets, i.e. layers of resins, for example epoxy resins or phenolic resins, to further improve the overall stability of the honeycomb structures. Honeycomb structures covered by facesheets are also termed sandwich composites with a honeycomb core. Composite materials, in particular prepregs (preimpregnated fibers) are increasingly used as face sheets because of their good fire retardant properties which are particularly important for applications in the aerospace industry.

Furthermore, materials suitable for applications in the aerospace industry and, in particular, for aircraft interiors need to meet a highly demanding property profile. This includes, inter alia, good mechanical properties and high compressive strength a high flame retardation and low emission of smoke and toxic fumes when burning while also being low-weight. Thus, composite structures comprising a honeycomb structure including voids filled with a void filler and covered on both sides with prepregs are very common in aerospace applications. In particular, due to their outstanding flame-smoke-toxic (FST) properties, phenolic prepregs are often used in critical aircraft parts.

However, it has been found that during the fabrication process of such composite structures (i.e. comprising honeycomb, prepregs such as prepregs in combination with void fillers) problems may occur. In particular, when being cut or drilled, prepreg delamination or damage in the interfaces with the honeycomb/void filler structure have been observed. Similarly, under hot and wet conditions, delamination defects have been observed. In addition, hot and wet conditions appear to increase defects observed when cutting and drilling the composite structures. Defects of these types may require costly and intensive repair work.

Furthermore, in aerospace industries, it is desirable that void filler compositions exhibit a combination of properties such as long work life at room temperature and no or low drop of viscosity over shop and shelf life.

Without contesting the technical advantages associated with the void filler composition known in the art for applications in composite honeycomb structures used in particular in aerospace applications, there is still a strong need for curable void filler compositions exhibiting a certain property profile including good mechanical properties and a certain resistance to delamination when used in combination with prepregs, in particular phenolic prepregs, and which also exhibit the aforementioned combination of desirable properties concerning work life and viscosity over shop life and shelf life.

Other advantages of the curable void filler compositions and methods of the present disclosure will be apparent from the following description.

SUMMARY

The present disclosure provides a curable void filler composition comprising at least one epoxy resin; at least one epoxy curing agent comprising at least one bicyclic carboxylic acid anhydride; and at least one epoxy silane compound according to formula (1), where formula (1) is Glycidoxy-R1Si(OR2)(OR3)(OR4), and R1 is selected from linear or branched alkyl comprising from 1 and 15 carbon atoms; and R2, R4 and R4 may be different or the same, and are independently selected from linear or branched alkyl comprising from 2 to 15 carbon atoms.

The present disclosure also provides a cured void filler, obtained from curing the curable void filler composition as disclosed herein.

Furthermore, the present disclosure provides a composite article comprising a honeycomb structure comprising a plurality of cells filled with a curable void filler composition as described herein or filled with a cured void filler as described herein.

The present disclosure further provides a method for producing a composite article. This method comprises providing a honeycomb structure comprising a plurality of cells; filling the cells of the honeycomb structure with the void filler composition as described herein; optionally, covering at least one external surface of the honeycomb structure with at least one layer; and curing the void filler composition.

Furthermore, the present disclosure relates to certain uses in applications of the automotive, commercial transportation and aerospace industries.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Furthermore, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt". or "wt.-%") unless specified otherwise. The amounts of all ingredients gives 100% wt unless specified otherwise. If the amounts of ingredients is identified by % mole the amount of all ingredients gives 100% mole unless specified otherwise.

The terms "solid" and "liquid" refer to ambient conditions (23° C., 1 bar).

Average particle sizes as referred to herein be number averages. In case of particles that are only substantially spherical the particle size is determined by adding the length of the two main (largest orthogonal) axes of the particle and dividing it by two. "Substantially spherical" means one or all main axes (x-, y- or z-axis) may deviate from the required length to form a perfect sphere by up to 50%, preferably up to 25%.

The curable compositions provided herein, preferably, are extrudable pastes. As used above and below, the term "extrudable paste" refers to compositions which have an initial extrusion rate measured as described in the test section below which is at least 50 g/min. More preferably, the initial extrusion rate is from 50 g/min up to 300 g/min.

Unless explicitly stated otherwise, all embodiments and optional features of the present disclosure can be combined freely.

The first aspect of the present disclosure is a curable void filler composition comprising at least one epoxy resin; at least one epoxy curing agent comprising at least one bicyclic carboxylic acid anhydride; and at least one epoxy silane compound according to formula (1), where formula (1) is Glycidoxy-R1Si(OR2)(OR3)(OR4), and R1 is selected from linear or branched alkyl comprising from 1 and 15 carbon atoms; and R2, R4 and R4 may be different or the same, and are independently selected from linear or branched alkyl comprising from 2 to 15 carbon atoms.

It has been surprisingly found that a curable void filler composition comprising the combination of above (a), (b) and (c) may provide a property profile useful for aerospace applications. In particular when used as void filler in honeycomb structures with prepregs such as phenolic prepregs, these curable void filler compositions may exhibit a combination of mechanical strength and a certain resistance to hot/wet conditions as well as an improved delamination resistance and may also exhibit improved properties when the composite structure is being cut or drilled. Moreover, the combination of ingredients in the curable void filler compositions according to the present invention, in particular the use of the epoxy curing agent comprising at least one bicyclic carboxylic anhydride and the at the least one epoxysilane compound according to formula (1), yields curable void filler composition which exhibit long work life as well as no or low viscosity drop over shop life and shelf life.

Epoxy Resins:

Epoxy resins are polymeric organic compounds having one or more oxirane ring polymerizable by a ring opening reaction. The epoxy-functionalities allow the resin to undertake cross-linking reactions. Such materials, broadly called epoxides, can be cycloaliphatic or aromatic, which means they have one or more unit that is cycloaliphatic or aromatic. Useful materials generally have at least two polymerizable epoxy groups per molecule and, more preferably, from two to four polymerizable epoxy groups per molecule. Typically, the epoxy resins may have an average epoxy-functionality of at least 1, greater than one, or of at least 2, or from about 1 to 4.

The epoxy resin is preferably free or essentially free of aromatic amine moieties. The term "essentially free" as used herein means that trace amounts may be present, for example, due to impurities present in the starting materials or as a result of production process. Such trace amounts include less than 10,000 ppm, preferably less than 5,000 ppm, based on the total amount of the composition.

Typically, but not exclusively, the epoxy resins contain repeating units derived from monomers having an epoxy-functionality as described above but epoxy resins can also include, for example, silicone-based polymers that contain epoxy groups or organic polymer particles coated with or modified with epoxy groups or particles coated with, dispersed in, or modified with epoxy-groups-containing polymers.

Mixtures of various epoxy resins may also be used in the compositions of the invention.

Epoxy resins may be selected from the group consisting of alkylene oxides, alkenyl oxides, glycidyl esters, glycidyl ethers, epoxy novolacs, copolymers of acrylic acid esters of glycidol and copolymerizable vinyl compounds, polyurethane polyepoxides, and mixtures thereof.

Preferably, the epoxy resins contain moieties of the glycidyl, diglycidyl or polyglycidyl ether type. Such epoxy resins may be obtained, for example, by the reaction of a hydroxyl functionality (for example but not limited to dihydric or polyhydric phenols or aliphatic alcohols including polyols) with an epichlorohydrine-functionality. As referred to herein, dihydric phenols are phenols containing at least two hydroxy groups bonded to the aromatic ring (also referred to as "aromatic" hydroxy groups) of a phenol, or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups. Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphrhylmethane, and the 2,2', 2,3', 2,4', 3,3', 3,4', and 4,4' isomers of dihydroxydiphenylmethane, dihydroxydiphenyldimethylmethane, dihydroxydiphenyl-ethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

It is preferred that the at least one epoxy resin comprises at least one aromatic moiety. Preferably, the at least one epoxy resin comprises repeating units derived from bisphenol A and epichlorohydrine, bisphenol F and epichlorohydrine or a combination thereof.

Preferred epoxy resins include epoxy resins containing or consisting of glycidyl ethers or polyglycidyl ethers of monohydric, dihydric or polyhydric phenols, such as for example, but not limited to bisphenol A, bisphenol F, including polymers comprising repeating units of these phenols. Preferred epoxy resins include epoxy novolacs. Epoxy novolacs are the reaction product of an epoxy group-introducing agent, such as for example epichlorohydrin, with a condensation product of a mono- di or polyhydric phenol (which may be alkylsubstituted (e.g. cresol) or non-substituted) and an aldehyde, such as for example, formaldehyde. Typical epoxy novolacs are polymers containing glycidyl ether groups and further comprising repeating units derived from bisphenol F or another reaction product of a phenol with an aldehyde. The phenol may be monohydric, dihydric or trihyidric and may be non-substituted or alkyl substituted.

Instead of, or in addition to, the aromatic epoxy resins described above also their fully or partially hydrogenated derivatives (i.e. the corresponding cycloaliphatic compounds) may be used.

The epoxy resins may be liquid at room temperature or solid. Typically, the epoxy resins may have a viscosity of from about 400 mPa·s at 20° C. to about 40,000 mPa·s at 50° C. Preferably, the resin has a viscosity of at least 8,000 mPa·s at 20° C. up to 5,000 mPa·s at 50° C. It is preferred that the at least one epoxy resin as used herein is liquid at room temperature. This is advantageous from a workability point of view.

The at least one epoxy resin preferably does not contain an —$NH_2$ or —$NH_3^+$ functionality. More preferably, the at least one epoxy resin preferably does not contain an aromatic amine moiety, such as for example a unit derived from an aminophenol.

Examples of commercially available epoxy resins include diglycidylether of bisphenol A (e.g. available under the trade designation EPON 828, EPON 830 or EPON 1001 from Hexion Speciality Chemicals GmbH, Rosbach, Germany, or under the trade designation D.E.R-331 or D.E.R-332 from Dow Chemical Co,); diglycidyl ether of bisphenol F (e.g. EPICLON 830 available from Dainippon Ink and Chemicals, Inc. or D.E.R.-354 from Dow Chemical Co, Schwalbach/Ts., Germany); silicone resins containing diglycidyl epoxy functionalities; flame retardant epoxy resins (e.g. DER 580, a brominated bisphenol type epoxy resin available from Dow Chemical Co.); Other epoxy resins based on bisphenols are commercially available under the trade designations EPIKOTE (Hexion Speciality Chemicals, Rosbach, Germany), or EPILOX (Leuna Epilox GmbH, Leuna, Germany). Epoxy novolacs are available under the trade designation D.E.N. from Dow Chemical Co, Schwalbach/Ts., Germany, such as for example D.E.N 431 (a novolac resin with an average epoxy functionality of 2.8 and a viscosity of from 1100 to 1700 mPa sat 51.7° C.), D.E.N. 425 a novolac resin with an average epoxy functionality of 2.5 and a viscosity of from 9500 to 12500 mPa s at 25° C., D.E.N. 438 a novolac resin with an average epoxy functionality of 3.6 and a viscosity of from 3100 to 4000 mPa sat 51.7° C.

Preferably, the curable void filler composition as described herein comprise the at least one epoxy resin in an amount of from 5 to 30 wt.-%, preferably of from 7 to 27 wt.-%, more preferably of from 8 to 25 wt.-%, even more preferably of from 9 to 22.5 wt.-%, based on the total weight of the composition.

Epoxy Curing Agent:

The curable void filler compositions according to the present disclosure comprise at least one epoxy curing agent comprising at least one bicyclic carboxylic acid anhydride compound. Thus, the curable void filler compositions as described herein may also contain mixtures and combinations of bicyclic carboxylic acid anhydrides and other epoxy curing agents. Epoxy curing agents are well-known in the art and refer to compounds that react with the oxirane ring of the epoxide to cause cross-linking. Epoxy curing agents are known in the art also as epoxide hardeners and accelerators. In the art, the term "curing agent" often denotes an epoxide hardener that is predominantly used to carry out the cross-linking agent, i.e. it is present in the hardening system as the major component (i.e. in major amounts).

Carboxylic acid anhydrides are known hardeners in the field of epoxy resin-based curable compositions. In the context of the present disclosure, bicyclic carboxylic acids are used. Furthermore, it is preferred that the at least one bicyclic carboxylic anhydride is liquid at room temperature. This is advantageous with regard to the general viscosity of the curable void filler compositions as described herein, which represents an important aspect for applicability of the void filler, in particular when the compositions comprise additional components such as filler materials (e.g. glass bubbles) or fire retardants. Surprisingly, bicyclic carboxylic acids anhydrides were found to be more stable than other carboxylic acid anhydrides, even more stable than cyclic carboxylic acid anhydrides without compromising epoxy curing performance. This yields curable void filler compositions having good curing performance and enhanced work life and general stability. This effect is even more pronounced in sterically hindered bicyclic carboxylic acid anhydrides, i.e. bicyclic carboxylic anhydrides which bear additional bulky or sterically demanding substituents. Accordingly, sterically hindered bicyclic carboxylic acid anhydrides are preferred for the curable void filler compositions as described herein. As bulky or sterically demanding substituents, all well-known or well-established substituents may be used, e.g. tert-butyl, isobutyl, and the like. For example, sterically hindered phtalic acid anhydrides isomers may be named. In this regard, tricyclic phtalic acid anhydrides isomers are preferred, with norbornene-based compounds being particularly preferred. In this regard, it is preferred that the at least one epoxy curing agent is selected from norbornene-based compounds, with norbornene-2,3-dicarboxylic acid anhydrides being particularly preferred. Preferably, the norbornene-2,3-dicarboxylic acid anhydride is selected from 5-norbornene-2,3-dicarboxylic acid anhydride, methyl-(endo)-5-norbornene-2,3-dicarboxylic acid anhydride, ethyl-(endo)-5-norbornene-2,3-dicarboxylic acid anhydride, and any combinations and mixtures thereof.

It is preferred that the curable void filler compositions according to the present disclosure comprise the at least one epoxy curing agent comprising a bicyclic carboxylic acid anhydride in an amount of from 5 to 45 wt.-%, preferably of from 10 to 40 wt.-%, more preferably of from 15 to 35 wt.-%, even more preferably of from 20 to 30 wt.-%, based on the total weight of the composition.

In addition, the curable void filler compositions as described herein may further comprise at least one curing additive. This curing additive is also able to cross-link epoxies, but is present in a much smaller amount than the above-described epoxy curing agent and may add to the curing speed of the composition. Accordingly, curing additives as described herein are also known in the art as "curing accelerators". Typical curing additives known in the art include boron trifluoride or trichloride amine complexes, imidazoles, imidazole derivatives, imidazole-like compounds and the like. Preferred herein are Specific examples include, for example, 2-(2-(2 methylimidazolyl)-ethyl)-4,6-diamino-s-triazine.

It is preferred that the curable void filler compositions as described herein comprise the at least one epoxy curing additive in an amount of from 0.01 to 10 wt.-%, preferably of from 0.05 to 5 wt.-%, more preferably of from 0.1 to 2 wt.-%, based on the total weight of the composition.

Epoxy Silane Compound:

The curable void filler compositions according to the present disclosure comprise at least one epoxy silane compound according to formula (1), where formula (1) is Glycidoxy-R1Si(OR2)(OR3)(OR4), and R1 is selected from linear or branched alkyl comprising from 1 and 15 carbon atoms; and R2, R4 and R4 may be different or the same, and are independently selected from linear or branched alkyl comprising from 2 to 15 carbon atoms.

The use of at least one epoxysilane compound according to formula (1) in combination with the at least one bicyclic carboxylic acid anhydride as epoxy curing agent has the surprising effect of increased work life and stability, an acceptable viscosity with regard to extrudability and workability of the void filler, in particular when also comprising glass bubbles and/or fire retardants, as well as improved (i.e. decreased) viscosity drop behaviour over time. Preferably, R1 of the at least one epoxysilane compound is selected from linear or branched ethyl, propyl, butyl, pentyl, hexyl, heptyl and octyl, preferably from linear or branched ethyl, propyl, butyl and pentyl, more preferably from linear ethyl, propyl and butyl. Similarly, it is preferred that R2, R3, and R4 of the at least one epoxysilane compound are independently selected from linear or branched ethyl, propyl, butyl, pentyl, hexyl, heptyl and octyl, preferably from linear or branched ethyl, propyl, butyl and pentyl, more preferably from linear ethyl, propyl and butyl. While it was found that methyl as either R1 to R4 does also generally function, it was also surprisingly found best results regarding improved viscosity and excellent stability at room temperature are obtained when residues as described herein are used in the curable void filler compositions as described herein. Moreover, it is preferred that the curable void filler compositions according to the present disclosure contains the at least one epoxysilane compound as described herein in an amount of from 0.1 to 20 wt.-%, preferably from 0.5 to 15 wt.-%, more preferably from 1 to 10 wt.-%. While lower amounts fail to show significant effects, higher amounts also at least do not provide any further improvements.

Reactive Diluents

The curable void filler compositions according to the present disclosure may further comprise at least one reactive epoxy diluent which may help to control the flow characteristics and further add to the mechanical properties of the cured void filler. These reactive epoxy diluents are typically monomeric epoxy-containing molecules, i.e. they contain at least one epoxy (or oxirane-) moiety. Preferred reactive epoxy diluents are diglycidyl ethers of a saturated or unsaturated compound. Preferably, the at least one reactive epoxy diluent is selected from diglycidyl ether of resorcinol, diglycidyl ether of cyclohexane dimethanol, diglycidyl ether of neopentyl glycol, diglycidyl ether of 1,6-hexanediol, triglycidyl ether of trimethylolpropane, and combinations and mixtures thereof. Examples of suitable commercially available reactive epoxy diluents are compounds from the Epodil series (such as Epodil 757) from Airproducts and compounds from the Heloxy HD series from Hexion.

Preferably, the curable void filler compositions as described herein comprise the at least one reactive epoxy diluent in an amount of from 1 to 20 wt.-%, preferably of from 2 to 17 wt.-%, more preferably of from 3 to 15 wt.-%, based on the total weight of the composition.

Flame Retardants

In order to comply with corresponding requirements in the aerospace industry, the curable void filler compositions according to the present disclosure may further comprise at least one flame retardant. That is, the at least one flame retardant as described herein may also referred to as a flame retardant system comprising at least two or at least three flame retardant compounds. In this regard, it is preferred that the at least one flame retardant is selected from phosphorous compounds, organohalogens, metal hydroxides, preferably aluminium hydroxide and magnesium hydroxide, huntite, hydromagnesite and borates, and expandable compounds, and combinations and mixtures thereof. Preferably, the phosphorous compounds comprise inorganic phosphorous compounds, preferably red phosphorous containing compound, preferably red phosphorous powder, optionally in the form of a blend of a stabilised micro encapsulated red phosphorous in an epoxy resin carrier, and organic phosphorous compounds, preferably organophosphorous compounds, preferably selected from organophosphates, preferably triphenyl phosphate, resorcinol bis (diphenylphosphate), bisphenol A diphenylphosphate, tricresyl phosphate, organophosphonates, preferably dimethyl(methylphosphonate), and phosphinates, preferably metal phosphinates, preferably metal selected from aluminium, iron, kalium, calcium, sodium, preferably phosphinates selected from diethyl phosphinate, dimethylphosphinate, dipropylphosphinate, dibutylphosphinate, diphenylphosphinate, preferably aluminium diethylphosphinate. Examples of commercially available compounds suitable for use as described herein include Exolit OP1230 (an organic phospinate) from Clariant, Exolit RP 6500 (microencapsulated red phosphorous in epoxy resin carrier) from Clariant and Saytex BT 93 (ethylene bis-tetrabromophthalimide) from Albemarle Corporation.

With regard to the expandable compound, it is preferred that this compound is an expandable carbon compound, preferably an expandable graphite intercalation compound. Graphite intercalation compounds are compounds in which organic compounds are inserted into the graphene planes of the graphene planes structure of graphite. Graphite intercalation compounds are also known under the designation expandable graphite and may be manufactured by treating graphite, such as natural graphite flake, with an intercalant of, e.g. a solution of sulfuric acid and nitric acid. The crystal structure of the graphite reacts to form a compound of graphite and the intercalant. Common methods for manufacturing particles of expandable graphite or graphite intercalation compounds are described, inter alia, in U.S. Pat. No. 3,404,061 and CA 2334274 A1, the disclosure of which is incorporated herein by reference. It is known that upon exposure to high temperatures, the expandable graphite expands in dimension as much as 80 or more times of their original volume in an accordion-like fashion in a direction perpendicular to the crystalline planes of the graphite. Exfoliated graphite particles may be vermiform in appearance, and are therefore commonly referred to as "worms". Without wanting to be bound by theory, it is assumed that the "worms" of expanded expandable graphite may act as a barrier to fire, both mechanically and because of their insulating properties. Examples of graphite intercalation compounds (i.e. expandable graphite) which may be advantageously used in the present disclosure are commercially available under the designations ES 100 C10, ES 250 B5 and ES 350 F5 from Graphit Kropfmühl/AMG Mining AG or Expand C.

With regard to obtain good flame retardant properties while maintaining good mechanical properties of the cured void filler it is preferred that the curable void filler compositions as described herein comprise the at least one fire retardant in an amount of from 5 to 40 wt.-%, preferably of from 7 to 35 wt.-%, and more preferably of from 10 to 30 wt.-%, based on the total weight of the composition.

Filler Material:

The curable void filler compositions as described herein may further comprise at least one filler material. Preferred are filler materials capable of reducing the density of the compositions. Capable of reducing the density of the composition as used herein means the filler has a lower density than the composition without the filler. Preferably, the compositions may comprise 1 to 50 wt.-%, preferably 5 to 45 wt.-%, more preferably 10 to 40 wt.-%, even more preferably 15 to 35 wt.-% of such a filler. Fillers capable of reducing the density of the precursor includes low density inorganic fillers, (i.e., fillers having a density of between 0.1 to 0.5 g/cm$^3$), low density organic fillers (i.e., fillers having a density of between 0.01 to 0.30 g/cm$^3$) but low density inorganic fillers are preferred over organic fillers because the letter tend to negatively influence the compressive strength. A combination of organic and inorganic fillers may be used but the inorganic low density fillers are preferably used in excess over the organic fillers.

The low-density inorganic fillers are preferably selected from inorganic particles, inorganic microspheres and in particular hollow inorganic microspheres. The microspheres may be selected from a variety of materials including by way of example glass, silica, ceramic (including sol-gel derived) or zirconia.

The fillers are preferably selected so that they allow for an advantageous density of the cured composition without sacrificing its compressive strength. The hollow inorganic microspheres exhibit a density of less than 0.5 g/cm$^3$, more preferably of between 0.12 and 0.42 g/cm$^3$. The fillers may have an average particle size typically of less than 500 μm, or between 10 and 100 μm.

Preferred hollow inorganic microspheres include glass microspheres which are commercially available, for example, from 3M Company under the trade designation Glass bubbles D32 or Scotchlite D32/4500.

Unexpanded organic hollow microsphere fillers are available, for example, from Akzo Nobel under the trade designation "Expancel®". Unexpanded organic hollow microspheres are sometimes also referred to as expandable organic microballoons which are also available, for example, from Lehmann and Voss, Hamburg, Germany under the trade designation Micropearl. Pre-expanded organic hollow microspheres are commercially available, for example, from Lehmann & Voss, Hamburg, Germany under the trade designation Dualite.

The concentration and the nature of the fillers used in the curable compositions is preferably selected such that the density of the cured composition is less than 1 g/cm$^3$, more preferably less than 0.9 g/cm$^3$ and most preferably between 0.5 and 0.8 g/cm$^3$.

The composition of the present invention may comprise further ingredients, adjuvants, which may be used to further regulate rheological properties or mechanical properties, adapt the visual appearance of the compositions or may help to prevent premature degradation of the compositions. These additional materials include, for example, fillers other than those described above, thixotropic agents, reactive diluents, pigments, antioxidants, adhesion promoters and the like.

Thixotropic agents may be added to control the flow characteristics of the adhesive composition. Thixotropic agents typically are particulate materials having particle sizes of less than 50 nm. Preferred thixotropic agents include fumed silica. Thixotropic agents are commercially available under the trade designation Cab-O-Sil from Cabot, Schwalbach im Taunus, Germany, or Aerosil from Degussa Evonik GmbH, Frankfurt, Germany.

Preferably, the filler material in the curable void filler compositions according to the present disclosure comprise at least one alkaline earth oxide and/or at least one alkaline oxide. This has the effect that advantageous hot/wet resistance as well as high mechanical strength and strong bonds to composite materials may be achieved. In particular, the curable void filler compositions as described herein may exhibit advantageous properties when phenolic resin containing sheets, i.e. prepregs, are used in lightweight composite honeycomb structures. Accordingly, the composite structures obtained may be less prone to delamination between core filler and phenolic resin materials, may exhibit better processability such as cutting and drilling. Thus, additional costs for repair of composite articles may be avoided. This is advantageous where lightweight honeycomb composite structures are used, e.g. in the aerospace industry.

Furthermore, it is preferred that the at least one alkaline oxide is selected from lithium oxide, sodium oxide and potassium oxide, and the at least one earth alkaline oxide is selected from magnesium oxide, calcium oxide, caesium oxide, and combinations thereof. It was found that alkaline earth oxides, in particular magnesium oxide and calcium oxide provided the best results with regard to mechanical properties of the cured void filler obtained by curing the curable void filler compositions as described herein. Accordingly, it is preferred that the curable void filler compositions as described herein comprise alkaline earth oxides, preferably magnesium oxide and/or calcium oxide, of which calcium oxide is particularly preferred.

Preferably, the curable void filler compositions according to the present disclosure comprise the at least one alkaline oxide and/or the at least one earth alkaline oxide in an amount of from 0.1 to 12 wt.-%, preferably of from 0.2 to 10 wt.-%, more preferably of from 0.3 to 5 wt.-%, based on the total weight of the composition.

An advantageous and preferred combination of filler materials of the curable void filler composition according to the present invention comprises at least one filler comprising at least one alkaline oxide and/or at least one earth alkaline oxide and/or hollow glass microspheres and/or silica.

Further filler materials include wetting agents, which are preferably selected from the group consisting of titanates, silanes, zirconates, zircoaluminates, phosphoric ester(s) and mixtures thereof. The wetting agent improves the mixability and processability of the composition and can also enhance the composition's handling characteristics. An especially useful wetting agent is commercially available as Coatex DO-UP6L from Coatex, Genay, France. The concentration of the wetting agent component comprising one or more wetting agents is typically lower than 6 percent by weight and more preferably not more than 5 percent by weight.

Pigments may include inorganic or organic pigments including ferric oxide, brick dust, carbon black, titanium oxide and the like.

Preferably, the curable void filler composition according to the present disclosure contains the at least one filler in an amount of from 10 to 50 wt.-%, preferably from 15 to 45 wt.-%, more preferably from 20 to 40 wt.-%.

Toughening Agents

The compositions may further comprise toughening agents. Toughening agents are polymers, other than the epoxy resins, capable of increasing the toughness of cured epoxy resins compared to the same composition not containing them (the difference in amount in such comparison studies is made up by the epoxy resin) and which are otherwise treated identically. Typical toughening agents include, for example, core-shell polymers or liquid butadiene-nitrile rubbers.

Preferably, the curable void filler compositions according to the present disclosure comprise
  (a) the least one epoxy resin in an amount of from 5 to 30 wt.-%, preferably of from 7 to 27 wt.-%, more preferably of from 8 to 25 wt.-%, even more preferably of from 9 to 22.5 wt.-%, based on the total weight of the composition;
  (b) the least one epoxy curing agent in an amount of from 5 to 45 wt.-%, preferably from 10 to 40 wt.-%, more preferably from 15 to 35 wt.-%;
  (c) the at least one epoxysilane compound is contained in an amount of from 0.1 to 20 wt.-%, preferably from 0.5 to 15 wt.-%, more preferably from 1 to 10 wt.-%
  (d) optionally, at least one reactive epoxy diluent in an amount of from 1 to 20 wt.-%, preferably of from 2 to 17 wt.-%, more preferably of from 3 to 15 wt.-%, based on the total weight of the composition;
  (e) optionally, at least one epoxy curing additive in an amount of from 0.01 to 10 wt.-%, preferably of from 0.05 to 5 wt.-%, more preferably of from 0.1 to 2 wt.-%, based on the total weight of the composition;
  (f) optionally, at least one fire retardant compound in an amount of from 5 to 40 wt.-%, preferably of from 7 to 35 wt.-%, and more preferably of from 10 to 30 wt.-%, based on the total weight of the composition;
  (g) optionally, at least one filler material in an amount of from 1 to 50 wt.-%, preferably of from 5 to 45 wt.-%, more preferably of from 10 to 40 wt.-%, even more preferably of from 15 to 35 wt.-%.

The curable compositions of the disclosure can be readily prepared by a number of techniques. For example, the various components may be added under ambient conditions to a suitable mixing vessel, such as a Mogul mixer. The vessel is preferably cooled to prevent reaction of the components during preparation and to facilitate removal of any heat generated during manufacture. Preferably the curable composition (also referred to herein as "void filler") is mixed at a temperature of less than 35° C. Additionally, slow mixing speeds are generally used to help prevent heat build-up in the mixer. Mixing is continued until the components form a homogeneous mixture, after which time the precursor is removed from the mixer.

The void fillers can be applied by conventional application equipment such as pumps and dispensing units. The void fillers of the present disclosure preferably are one-part compositions, i. e. they already comprise the hardener component as compared to two-part composition, where the hardening components are kept separated from the epoxy resin until use of the compositions. One-part void fillers of the present invention preferably exhibit a good shelf life time at room temperature. One-part compositions contain a reactive system and are therefore, preferably kept at low temperatures for storage. A good shelf life at room temperature as referred to herein can be determined by measuring the time (from preparing the composition or from the time it has reached room temperature (20° C.) after having been kept at −18° C.) until the composition thickens such that it becomes more difficult or impossible to apply. A slow rate of thickening is acceptable. A composition is considered to have a good shelf life at room temperature, if its extrusion rate (as measured according to the methods described below) is greater than 60 g/min after storage for 5 days at room temperature. Moreover, the curable void filler compositions as described herein preferably exhibit an extrusion rate according to AITM 7-003 of at least 15 g/15 s, preferably of at least 25 g/15 s, more preferably of at least 35 g/15 s. Preferably, the curable void filler compositions as described herein preferably exhibit an extrusion rate according to AITM 7-004 of at least 15 g/15 s, preferably of at least 18 g/15 s, more preferably of at least 20 g/15 s. Preferably, the curable void filler compositions as described herein preferably exhibit an extrusion rate according to AITM 7-005 of at least 10 g/15 s, preferably of at least 15 g/15 s, more preferably of at least 18 g/15 s. Curable void filler compositions having these extrusion rates are excellently suited for applications in aerospace manufacturing operations.

The present disclosure further provides a cured void filler, obtained by curing the curable void filler compositions as described herein. As will be further elaborated below, curing may be carried out by heating the curable composition.

Preferably, the cured void filler exhibits a cured density according to ISO 1183 of less than 1.0, preferably of less than 0.9, more preferably of not more than 0.8, even more preferably of less than 0.75. It is also preferred that the cured void filler exhibits a compressive strength according to ISO 604 at 23° C. of at least 45 MPa, preferably of at least 50 MPa, more preferably of at least 55 MPa, and even more preferably of at least 60 MPa. Finally, it is preferred that the cured void filler exhibits a smoke density according to AITM 2.0007A of not more than 220, preferably of not more than 200, more preferably of not more than 180, and even more preferably of not more than 160. With the cured void filler as described herein exhibiting at least one or preferably a combination or even all of the above properties, a property profile highly desirable for applications in the aerospace industry is obtained.

The curable void filler compositions as described herein are particular useful as core filler for honeycomb structures, in particular honeycombs used in aircrafts and in particular honeycombs used in the interior of an aircraft, for example in interior walls or in floor panels. Typical embodiments are capable of withstanding the forces encountered when used at the interface of a pressurized and non-pressurized zone of a passenger aircraft.

Accordingly, the present disclosure further provides a composite article comprising a honeycomb structure comprising a plurality of cells filled with a curable void filler composition or a cured void filler as described herein.

Typically, the honeycomb structure has a honeycomb frame containing a plurality of cells. The cells in a honeycomb structures may typically range from 0.4 cm up to 15 cm in at least one or all three dimensions (maximum length, maximum width and maximum height of the cell). The cells may be rectangular or hexagonal or may have any other shape. The honeycomb frame surrounding the cells is typically made of metal, for example but not limited to steel and aluminium. The honeycomb frame may also be not metallic and contain fibers or fibers composites, like glass fiber composite or carbon fiber composites.

It is preferred that the composite article further comprises at least one layer covering at least part of an external surface of the honeycomb structure, wherein at least part of an external surface of the at least one layer has a common interface with the cells filled with the compositions or cured void fillers as described herein. The covering layer may be in form of a sheet or a film. Preferably, said layer comprises a composite material containing fibers embedded in a resin. It is preferred that the resin comprises at least one epoxy resin and/or at least one phenolic resin. The fibers are preferably selected from carbon fibers, glass fibers, polymeric fibers, ceramic fibers, metal fibers, and mixtures thereof.

In some embodiments at least one of the external surface of the honeycomb is at least partially covered by a layer comprising a composite material containing fibers embedded in a resin, e.g. a prepreg (preimpregnated fiber materials). The resin may be an epoxy resin as described above or a phenolic resin as described below and including blends or combinations thereof. The layer may be, for example, in the form of a coating or a sheet. The sheet may be laminated or adhesively bonded or fixed to the honeycomb structure mechanically or is co-cured with the cell filler. Phenolic resins as referred to herein are polymeric materials based on the reaction-product of one or more phenol and one or more aldehyde, typically formaldehyde. In the latter case the phenolic resins are also referred to as phenol-formaldehyde resins. Phenolic resins also include novolac resins. Novolacs comprise the reaction product of an epoxy group-introducing agent, such as for example epichlorohydrin, with a condensation product of a mono-di or polyhydric phenol and an aldehyde, such as for example, formaldehyde. The phenol may be alkylsubstituted (e.g. cresol) or non-substituted). Typical epoxy novolacs are polymers containing glycidyl ether groups and further comprising repeating units derived from the condensation of bisphenol F, bisphenol A or another phenol or polyphenol with an aldehyde.

The fibers of the composite materials include, for example, inorganic fibers and organic fibers. Inorganic fibers include glass fibers, ceramic fibers and carbon fibers. Organic fibers include polyamide fibers, for example aromatic polyamides like aramide fibers. Commercial phenolic prepregs include, for example, HexPly®93 and HexPly®200 available from Hexcel Corporation, Stamford, CT, USA.

Further provided herein is a method for producing a composite article, with the method comprising:
(I) Providing a honeycomb structure comprising a plurality of cells;
(II) Filling the cells of the honeycomb structure with the curable void filler composition as described herein;
(III) Optionally, covering at least one external surface of the honeycombs structure with at least one layer, preferably a sheet comprising a composite material containing fibers embedded in a resin as described herein;
(IV) Curing the void filler composition.

Preferably, the composite material in step (III) is a phenolic prepreg sheet as described herein. In this regard, it is preferred to co-cure the void filler composition and the sheet in step (IV). Curing can be carried out as described above in connection with the composite article according to the present disclosure.

Furthermore, the present disclosure provides a use of the curable void filler composition as described herein for the manufacture of composite articles comprising a honeycomb structure. Preferably, the composite articles are lightweight composite articles for aerospace industries.

Similarly, the present disclosure provides a use of the curable void filler composition as described herein in manufacturing processes for lightweight sandwich composite structures, preferably for aerospace, automotive, and commercial transportation industries.

EXAMPLES

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.
Materials Used:

| Raw Materials - Trade Name | Description/Function | Supplier |
| --- | --- | --- |
| Epikote 232 | Bis Phenol A/F Epoxy Resin | Resolution Performance Products |
| Disparlon 6500 | Polyamide Wax/Thixotropic agent | King Industries |
| Heloxy HD | Reactive diluent | Air Products |
| Omicure BC120 | Boron Trichloride Amine Complex/Cure Accelerator | CVC Chemicals |
| MTHPA/604 | Tetrahydromethylphthalic anhydride/curing agent | Polynt |
| METH/E | Methyl-(endo)-5-norbomene-2,3-dicarboxylic anhydride/curing agent | Polynt |
| Exolit RP 6500 | Encapsulated red phosphorus/Flame retardant | Clariant |
| Kronos 2310 | Titanium Dioxide/Filler | Kronos |
| Exolit RP 6500 | Flame retardant | Clariant |
| Martinal 104Leo or just Aluminum hydroxide | Aluminum trihydrate/Flame retardant | Huber Materials |
| Saytex BT 93-W | 1,2-Bis-(tetrabromophthalimido)ethane/Flame retardant | Albemarle |
| Dynasylan Glyeo | 3-Glycidyloxypropyltriethoxysilane/adhesion promoter | Evonik |
| Dynasylan Glymo | 3-Glycidyloxypropyltrimetoxysilane/adhesion promoter | Evonik |
| Aerosil R202 | Fumed Silica/Thixtropic agent | Degussa |
| GBB S38HS Hollow glass microspheres | Glass bubbles/weight reduction | 3M |
| WFK 40 | Calcium oxide/filler | Maerker Kalk GmbH |

Test Methods
Extrusion Rate

The processability of the curable void filler composition was evaluated at room temperature (23° C.) by extruding it through standard equipment using the following procedure. An air driven application pistol (available from SEMCO, East Kilbride, U.K) was fitted with a 150 ml disposable cartridge and a nozzle having an aperture of 4 mm. The disposable cartridge was filled with the curable void filler composition and by applying an air pressure of 4 bars the curable epoxy composition was extruded. The extrusion rate was determined by measuring the quantity extruded in 15 seconds.

Measurements were made immediately after the curable void filler composition was prepared (initial extrusion rate). Each curable void filler composition was evaluated 3 times and the results averaged.

Additional measurements were done after the curable void filler composition was kept 5 days (or 10 days, respectively) at a temperature of 23 (±2) ° C. and 50% relative humidity. The test results provided below are averages from three measurements.

Cured Density

Cured density of samples obtained by curing the curable void filler compositions according to the examples and comparative examples as described herein was determined according to ISO 1183.

Compressive Strength 200 g of the curable void filler composition were cast into a release-coated mould having the dimensions of 12.5 mm (height)×12.5 mm (width)×25 mm (length) and being open on one major side. The mould was placed in a forced air oven. The oven temperature was raised from 23° C. to 140° C. with heating rate of 3-5° C./min. Then the temperature was held at 140° C. for 50 min and then the temperature was allowed to cool down to 23° C. over a period of 45 minutes.

All test specimens were compressed along their 25 mm axis at a rate of 0.5 mm/min by using a Zwick Model Z050 Tensile Tester (Zwick GmbH & CO., Ulm, Germany), equipped with heating capability.

Compressive strength was measured at 23° C. (room temperature). The test specimens were preconditioned in room temperature for at least 30 minutes before testing.

Six samples were measured for each epoxy composition. The results were averaged and recorded in MPa.

Vertical Flammability Test:

A sheet having a thickness of 3-5 mm was prepared by pouring the composition into an aluminium release-treated mould and curing it in an air forced oven using the same curing cycle from 23° C. to 140° C. as described previously for the compressive strength test. Samples having the dimensions of 3 mm×75 mm×300 mm were then cut from this large sheet.

The flame retardancy (FR) was tested in a vertical configuration accordingly to FAR-25, Appendix F, Part 1 (a) (1) (ii) [Version 01-2012] for 60 seconds. The tested material passes when under following conditions: the tested material must be self-extinguishing; the average burn length may not exceed 6 inches and the average flame time after removal of the flame source may not exceed 15 seconds; drippings from the test specimen may not continue to flame for more than an average of 3 seconds after falling.

Preparation of Examples and Comparative Examples

Epoxy-based curable compositions were prepared by combining in each case the compounds listed below in Table 1 in a 2.0 liter mechanical mogul type mixer commercially available by Linden GmbH, Germany. In Table 1, all concentrations are given as weight percent.

A temperature of less than 35° C. was maintained during the mixing process, using water-cooling. The epoxy resin was added first and mixed at 20 to 40 rpm with the other ingredients wherein the ingredients are added one after each other and are mixed for about 20 minutes until a homogeneous blend was achieved before the next ingredient was added. In a final step the homogeneous blend was degassed by applying a 100 mbar vacuum for 5 minutes. The curable void filler composition formulations were stored at −18° C.

All curable void filler compositions were pastes having a smooth and uniform consistence.

TABLE 1 composition of example 1 and comparative examples 1-3 (amounts in % by weight)

|  | Comp. Ex. 1 | Comp. Ex. 2 | Comp. Ex. 3 | Ex. 1 |
|---|---|---|---|---|
| Epoxy resin and modifier | 19 | 19 | 19 | 19 |
| Flame retardants | 27 | 27 | 27 | 27 |
| Dynasylan Glymo | 2.5 | 0 | 2.5 | 0 |
| Dynasylan Glyeo | 0 | 2.5 | 0 | 2.5 |
| MTPHA | 22 | 22 | 0 | 0 |
| METH/E | 0 | 0 | 22 | 22 |
| Fillers | 29 | 29 | 29 | 29 |
| Cure Accelerator | 0.5 | 0.5 | 0.5 | 0.5 |
| Total | 99.5 | 100 | 100 | 100 |

TABLE 2

Properties of cured void filler compositions of examples 1 and comparative examples 1 to 3

|  | Comp. Ex. 1 | Comp. Ex. 2 | Comp. Ex. 3 | Ex. 1 |
|---|---|---|---|---|
| Extrusion rate after 1 day (g/15 sec) | 16 | 21 | 32 | 48 |
| Extrusion rate after 5 days (g/15 sec) | 6 | 8 | 13 | 25 |
| Extrusion rate after 10 days (g/15 sec) | ND | ND | ND | 20 |
| Skin Formation after 24 h | Yes | Yes | Yes | no |
| Cured Density (g/cc) | 0.73 | 0.73 | 0.73 | 0.73 |
| Compressive strength (Mpa) | 68 | 72 | 65 | 66 |
| Flammabilty 60s vertical | Pass | Pass | Pass | Pass |

The invention claimed is:

1. A curable void filler composition comprising:
   (a) at least one epoxy resin;
   (b) at least one epoxy curing agent comprising at least one bicyclic carboxylic acid anhydride;
   (c) at least one epoxysilane compound according to formula (1)

Glycidoxy-R1Si(OR2)(OR3)(OR4)    formula(1)

wherein
   R1 is selected from linear or branched alkyl comprising from 1 and 15 carbon atoms;
   R2, R3, and R4 may be different or the same, and are independently selected from linear or branched alkyl comprising from 2 to 15 carbon atoms.

2. The curable void filler composition according to claim 1, wherein R1 of the at least one epoxysilane compound is selected from linear or branched ethyl, propyl, butyl, pentyl, hexyl, heptyl and octyl.

3. The curable void filler composition according to claim 1, wherein R2, R3, and R4 of the at least one epoxysilane compound are independently selected from linear or branched ethyl, propyl, butyl, pentyl, hexyl, heptyl and octyl.

4. The curable void filler composition according to claim 1, wherein the at least one epoxysilane compound is contained in an amount of from 0.1 to 20 wt. % with respect to the weight of the curable void filler composition.

5. The curable void filler composition according to claim 1, wherein the at least one bicyclic carboxylic acid anhydride is a sterically hindered bicyclic compound.

6. The curable void filler composition according to claim 5, wherein the at least one epoxy curing agent is selected from norbornene-based compounds.

7. The curable void filler composition according to claim 6, wherein the norbornene-based compound is selected from norbornene-2,3-dicarboxlic acid anhydrides which may be further substituted.

8. The curable void filler composition according to claim 7, wherein the norbonene-2,3-dicarboxylic acid anhydrides is selected from 5-norbornene-2,3-dicarboxylic acid anhydride, methyl-(endo)-5-norbornene-2,3-dicarboxylic acid anhydride, ethyl-(endo)-5-norbornene-2,3-dicarboxylic acid anhydride, and any combinations and mixtures thereof.

9. The curable void filler composition according to claim 1, wherein the at least one epoxy curing agent is contained in an amount of from 5 to 45 wt.-% with with respect to the weight of the curable void filler composition.

10. The curable void filler composition according to claim 1, further comprising at least one filler comprising at least one alkaline oxide and/or at least one earth alkaline oxide and/or hollow glass microspheres and/or silica.

11. The curable void filler composition according to claim 1, further comprising at least one reactive epoxy diluent.

12. The curable void filler composition according to claim 2, wherein R2, R3, and R4 of the at least one epoxysilane compound are independently selected from linear or branched ethyl, propyl, butyl, pentyl, hexyl, heptyl and octyl.

13. The curable void filler composition according to claim 4, wherein the at least one epoxysilane compound is contained in an amount of from 1 to 10 wt.-% with respect to the weight of the curable void filler composition.

14. The curable void filler composition according to claim 5, wherein the at least one bicyclic carboxylic acid anhydride is a sterically hindered tricyclic compound.

15. The curable void filler composition according to claim 9, wherein the at least one epoxy curing agent is contained in an amount of from 15 to 35 wt.-% with respect to the weight of the curable void filler composition.

16. The curable void filler composition according to claim 11, wherein the at least one reactive epoxy diluent is a diglycidyl ether of a saturated or unsaturated compound.

* * * * *